United States Patent
Odom

(10) Patent No.: US 10,652,440 B2
(45) Date of Patent: May 12, 2020

(54) HERMETICALLY SEALED CAMERA WITH A GRAPHICAL PROCESSING UNIT (GPU)

(71) Applicant: Boulder AI, Longmont, CO (US)

(72) Inventor: Darren J. Odom, Longmont, CO (US)

(73) Assignee: Boulder A1, Longmont, CO (US)

( * ) Notice: Subject to any disclaimer, the term of this patent is extended or adjusted under 35 U.S.C. 154(b) by 0 days.

(21) Appl. No.: 16/042,667

(22) Filed: Jul. 23, 2018

(65) Prior Publication Data

US 2019/0028617 A1    Jan. 24, 2019

Related U.S. Application Data

(60) Provisional application No. 62/604,852, filed on Jul. 24, 2017.

(51) Int. Cl.
*H04N 5/225* (2006.01)
*G03B 17/55* (2006.01)
*G03B 17/08* (2006.01)
*G03B 3/10* (2006.01)

(52) U.S. Cl.
CPC ........... *H04N 5/22521* (2018.08); *G03B 3/10* (2013.01); *G03B 17/08* (2013.01); *G03B 17/55* (2013.01)

(58) Field of Classification Search
CPC .... H04N 5/22521; G03B 17/55; G03B 17/08; G03B 3/10
See application file for complete search history.

(56) References Cited

U.S. PATENT DOCUMENTS

| | | | |
|---|---|---|---|
| 5,619,619 A * | 4/1997 | Shinohara | G06F 3/011 706/28 |
| 5,864,365 A | 1/1999 | Sramek et al. | |
| 6,618,092 B2 * | 9/2003 | Alessio | H04N 5/2252 348/143 |
| 2004/0228504 A1 * | 11/2004 | Chang | G06K 9/00288 382/118 |
| 2008/0055409 A1 * | 3/2008 | Mars | G03B 37/02 348/143 |
| 2009/0322937 A1 * | 12/2009 | Young | H04B 7/0814 348/373 |
| 2010/0111489 A1 | 5/2010 | Presler | |
| 2014/0098220 A1 * | 4/2014 | Nunnink | H04N 5/225 348/135 |

(Continued)

OTHER PUBLICATIONS

PCT Notification of Transmittal of the International Search Report and the Written Opinion of the International Searching Authority for the PCT Application No. PCT/US 18/43547, dated Jul. 24, 2018, 8 pages.

*Primary Examiner* — Nhan T Tran
(74) *Attorney, Agent, or Firm* — Baker & Hostetler LLP

(57) ABSTRACT

A camera system includes a hermetically sealed housing, wherein the hermetically sealed housing comprises an external heat sink integrated with the hermetically sealed housing. The camera system further includes a first camera disposed within the hermetically sealed housing. The first camera includes a lens, and a motor, wherein the motor is to physically adjust the lens. The camera system further includes a graphics processing unit (GPU) coupled to the camera and disposed within the hermetically sealed housing. The GPU processes image information of an image captured by the first camera, wherein the external heat sink is to absorb heat generated by the GPU.

19 Claims, 9 Drawing Sheets

(56) References Cited

U.S. PATENT DOCUMENTS

| | | | |
|---|---|---|---|
| 2015/0049243 A1* | 2/2015 | Samuels | G03B 17/56 |
| | | | 348/374 |
| 2015/0302735 A1 | 10/2015 | Geerlings et al. | |
| 2015/0365569 A1* | 12/2015 | Mai | H04N 5/2252 |
| | | | 348/373 |
| 2016/0022374 A1 | 1/2016 | Haider et al. | |
| 2018/0054553 A1* | 2/2018 | Choi | H04N 5/2258 |
| 2018/0373999 A1* | 12/2018 | Xu | G06T 11/60 |
| 2019/0222756 A1* | 7/2019 | Moloney | G06F 16/164 |

* cited by examiner

300

500

```
Capture, by a camera disposed in a hermetically sealed housing, an
image, wherein the hermetically sealed housing comprises an external heat
sink integrated with the hermetically sealed housing.
510
```

```
Process, by a graphics processing unit (GPU) disposed in the hermetically
sealed housing, image information of the image to recognize patterns in the
image information, wherein the external heat sink is to absorb heat generated
by the GPU.
520
```

```
Output the processed image information.
530
```

FIG. 5

HERMETICALLY SEALED CAMERA WITH A GRAPHICAL PROCESSING UNIT (GPU)

RELATED APPLICATIONS

This application claims the benefit of U.S. Provisional Application No. 62/604,852, filed on Jul. 24, 2017, the contents of which are hereby incorporated by reference herein.

BACKGROUND

Machine vision systems include one or more cameras to capture images. The captured images are used in various applications, such as inspection of items, process control, security, smart city, etc. The images captured by the camera are transmitted to a computer system for processing and/or analyzing. In conventional machine vision systems, the computer system that receives the images from the camera is separate and distinct from the camera.

In some conventional machine vision systems, the computer system is typically in proximity to the camera (e.g., in a room near the camera). This can be referred to as edge computing. Typically, the environment for machine vision systems introduces a host of factors that can negatively affect the functionality of the computer system, such as heat, dust, water, bugs, and so on. As a result, there is increased expense and burden to protect the computer system from the environment. Moreover, the computer system may fail due to extended exposure to the environment.

In other conventional machine vision systems, the computer system is a cloud-based computing system where image data is transmitted over a network. The image data is then processed using the cloud-based computing system. This typically utilizes a network connection that is capable of handling a large amount of data to be consistently transmitted. However, if the network connection fails (or has decreased bandwidth or intermittent connection), then the machine vision system may be rendered useless.

Moreover, when a camera is connected over a network, the image information captured by the camera is compressed and subsequently transmitted over the network. As a result, the image information is lost or reduced. The image information is dynamic range, temporal and spatial detail, resolution, etc.

BRIEF DESCRIPTION OF THE DRAWINGS

Embodiments of present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

Reference will now be made to the accompanying drawings showing examples of the present application, and in which:

FIG. 5 is a flow chart of an embodiment for a method of image processing in a hermetically sealed housing.

DETAILED DESCRIPTION

Figure 1A:
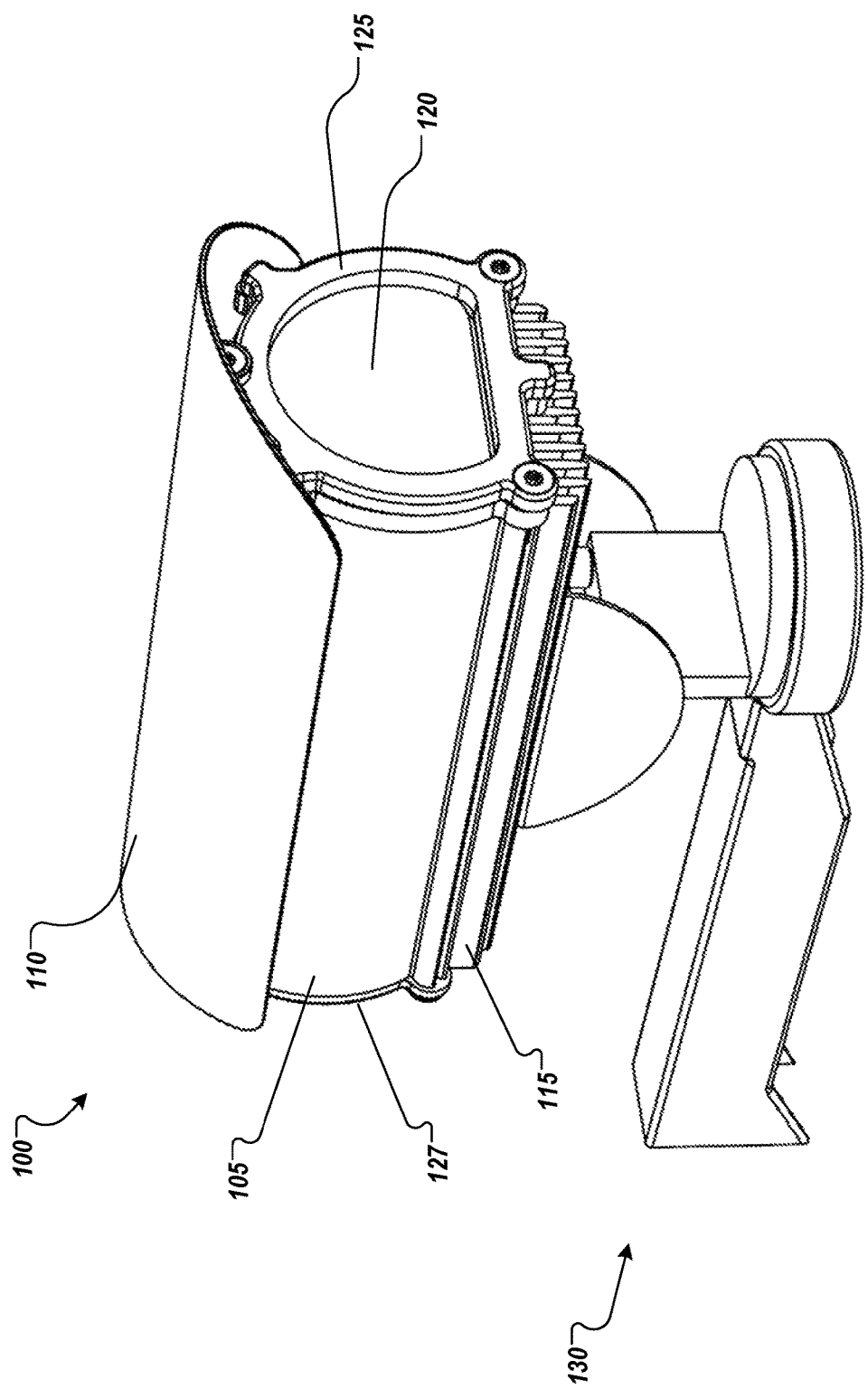
FIG. 1A is a diagram depicting an isometric view of a camera system, in accordance with an embodiment of the disclosure.

As described above, computer systems that process image data in conventional machine vision systems are separate and distinct from the cameras that capture the images. For example, a camera captures images and the images are then transmitted to the computer system. Cameras, in conventional machine systems, do not include a processing unit, such as a graphics processing unit (GPU) or a high performance general purpose processing unit). Moreover, processing of image information on a computer system apart from the camera can negatively affect the conventional machine vision system, as described above.

In contrast to conventional machine vision systems, embodiments described herein are directed to a camera system that includes a GPU. In particular, the camera system (that includes a GPU) is a hermetically sealed camera system. Hermetically sealed, as used herein, refers to camera system being air tight and water tight. In other words, the camera system (within the housing of the camera system) is sealed in such a way that the camera system is impervious to external environmental influences such as, bug, ambient air, water and so on. As a result, various components within a housing of the camera system (e.g., camera, processing unit (e.g., GPU), and other electrical devices) are protected from the external environmental influences.

As such, the images captured by the camera are processed, at least in part, by the GPU of the camera system (rather than by a separate and distinct computer system). Additionally, the hermetically sealed structure of the camera system protects it from the environment (e.g., water, heat, dust, bugs, etc.). As a result, the camera system is able to be located and function in harsh environments for an extended amount of time without being negatively affected by the harsh environment.

As described in further detail herein, the camera system can capture large amounts of image information (e.g., image data). The camera system, located in the field (e.g., a store front, a fish ladder, a remote location), performs data reduction (in real-time) associated with various image data collecting applications. Data reduction, as described herein, is the extraction of high-level information from an information source (e.g., a large information source such as streaming video) and the reduction of the information into specific and concise information. The reduced information can include, but is not limited to, classification, tracking, context extraction and other machine vision tasks.

In one example embodiment, a camera system is disposed underwater to track fish that swim in proximity to the camera system. In this example, the camera system is able to sense movement of the fish. In response to sensing the movement of a fish, the camera system focuses in on a fish and maintains focus on the fish. While focused on the fish, a species of the fish is determined (e.g., using one or more neural networks trained to determine a fish species). Accordingly, reduced information associated with images of the fish (e.g., fish species) is transmitted from the camera system.

In another example embodiment, a camera system is disposed proximate to a store front. Image information associated with persons walking by the store front is captured. The camera system is able to determine reduced information associated with the persons walking by the store front (e.g., using one or more neural networks trained to determine number of people, age range of the people). Accordingly, the reduced information associated with persons walking by the store front is transmitted from the camera system.

In various embodiments, the camera system utilizes machine learning via training of a neural network. In general, a neural network is a system of hardware and/or software patterned after the operation of neurons in the human brain. Neural networks are adaptive by modifying themselves as they learn from initial training. Subsequent execution of the neural network provides more information in determining their output. The neural network, described herein, is able to recognize patterns of image information from images captured by the camera system. Additional description related to the neural network is provided in further detail below.

Embodiments described herein are directed to a camera system that includes a hermetically sealed housing, wherein the hermetically sealed housing includes an external heat sink integrated with the hermetically sealed housing and a camera disposed within the hermetically sealed housing. The camera may include a lens and a motor, where the motor is to physically adjust the lens. The camera system also includes a GPU coupled to the camera and disposed within the hermetically sealed housing. The GPU can process image information of an image captured by the camera. Additionally, the external heat sink can absorb heat generated by the GPU.

FIGS. 1A-D depict embodiments of camera system 100 according to various embodiments of the disclosure. FIGS. 1A-D depict various views of the camera system. Referring to FIG. 1A (an isometric view of camera system 100), camera system 100 includes housing 105 and mount 130. Camera system 100, in one embodiment, is coupled to mount 130. Mount 130, in various embodiments, is attached to a structure. A structure, as described herein, is a physical object that the camera is able to mount to (e.g., tree, wall, rock, etc.). It should be appreciated that camera system 100 can be attached to a structure via other mechanical mounting means.

Camera system 100 also includes first end cap 125, second end cap 127, front glass 120 and glare cover 110. In various embodiments, second end cap 127 is coupled to a first distal end of housing 105 and first end cap 125 is coupled to a second distal end of the housing 105. Additionally, front glass 120 is also coupled to the second distal end of housing 105. Accordingly, when first end cap 125 and second end cap 127 (and front glass 120) are coupled with the respective distal ends of housing 105, housing 105 is hermetically sealed (e.g., air tight and water tight). As will be described in further detail below, with respect to at least FIG. 1B, camera system 100 includes O-rings 126 and 128 and fasteners 140 (e.g., screws) to facilitate in the hermetically sealing of housing 105 (e.g., water, bugs, dust cannot penetrate into the housing). As depicted, housing 105 is substantially cylindrical. However, it should be appreciated that housing 105 can be any shape that facilitates in housing a camera system and being hermetically sealed.

Housing 105 includes heat sink 115. Heat sink 115 is disposed on a bottom surface of housing 105. As described in further detail herein, various electrical components (e.g., GPU) are disposed within housing 105 in proximity to heat sink 115. Due to housing 105 being hermetically sealed, heat is unable to be removed from within housing 105 by conventional means (e.g., fan(s), heat exhaust ports, etc.). As such, heat generated by the electrical components within housing 105 is dissipated out of housing 105 to ambient air outside of housing via heat sink 115. That is, camera system 100 is passively cooled (e.g., without the use of a fan within the housing) via heat sink 115.

Heat sink 115 extends a substantial length (e.g., an entire length) of housing 105. Heat sink 115 includes various protrusions 116 (e.g., heat sink fins). Protrusions 116 are parallel to one another. Alternatively, protrusions 116 can protrude from heat sink 115 at any orientation to facilitate dissipating heat from the inside of housing 105 to the outside of housing 105.

In one embodiment, heat sink 115 is integral with housing 105. That is, heat sink 115 and housing 105 comprise a single unit. Alternatively, heat sink 115 and housing 105 are separate and distinct components that are coupled together via a fastening means (e.g., screw, glue, etc.).

Figure 1B:
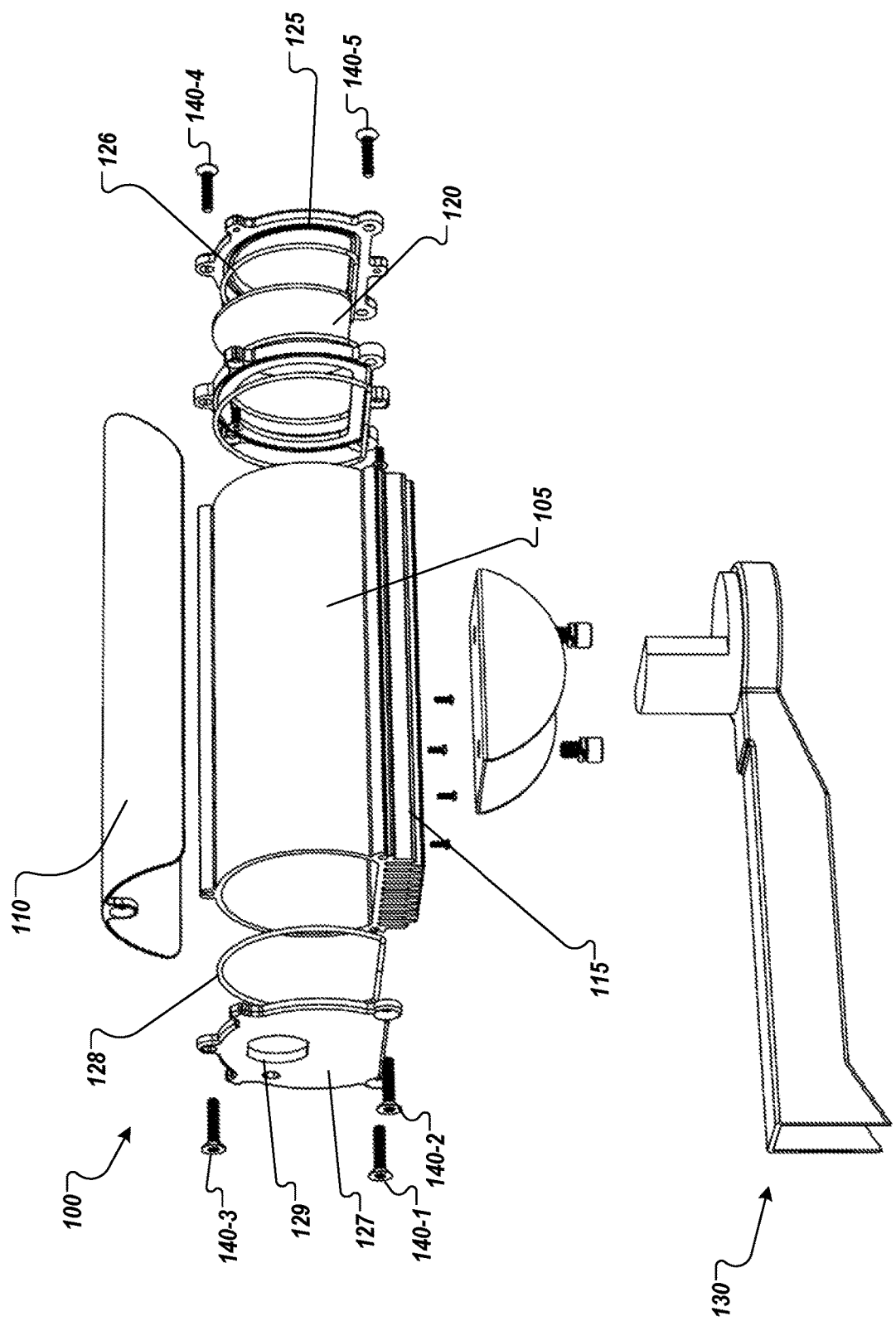
FIG. 1B is a diagram depicting an exploded isometric view of a camera system, in accordance with an embodiment of the disclosure.

FIG. 1B is an isometric exploded view of camera system 100 according to an embodiment of the disclosure. FIG. 1B illustrates additional components of camera system 100. In particular, FIG. 1B illustrates various components coupled with housing 105. Camera system 100 includes O-rings 126 and 128 and fasteners 140 (e.g., screws) to facilitate in the hermetically sealing of housing 105. For example, O-ring 128 is disposed between second end cap 127 and housing 105 to hermetically seal the end cap with the housing. O-ring 126 is disposed between first end cap 125 and front glass 120 to facilitate in hermetically sealing the combination of first end cap 125 and front glass 120 to housing 105. Moreover, fasteners 140-1, 140-2 and 140-3 fasten second end cap 127 to housing 105. For example, fasteners 140-1, 140-2 and 140-3, when fastened (e.g., tightened), provide pressure to seat second end cap 127 and O-ring 128 to a distal end of housing 105. Likewise, fasteners 140-4 and 140-5 fasten at least first end cap 125, front glass 120 and O-ring 126 to housing 105. For example, fasteners 140-4 and 145-3, when fastened (e.g., tightened), provide pressure to seat at least first end cap 125, front glass 120 and O-ring 126 to the opposite distal end of housing 105. As a result, housing 105 is hermetically sealed as described herein.

Second end cap 127 includes aperture 129. Aperture 129 is to receive an input/output (I/O) coupler (not shown). In one embodiment, the I/O coupler is a waterproof RJ45 coupler.

Figure 1C:
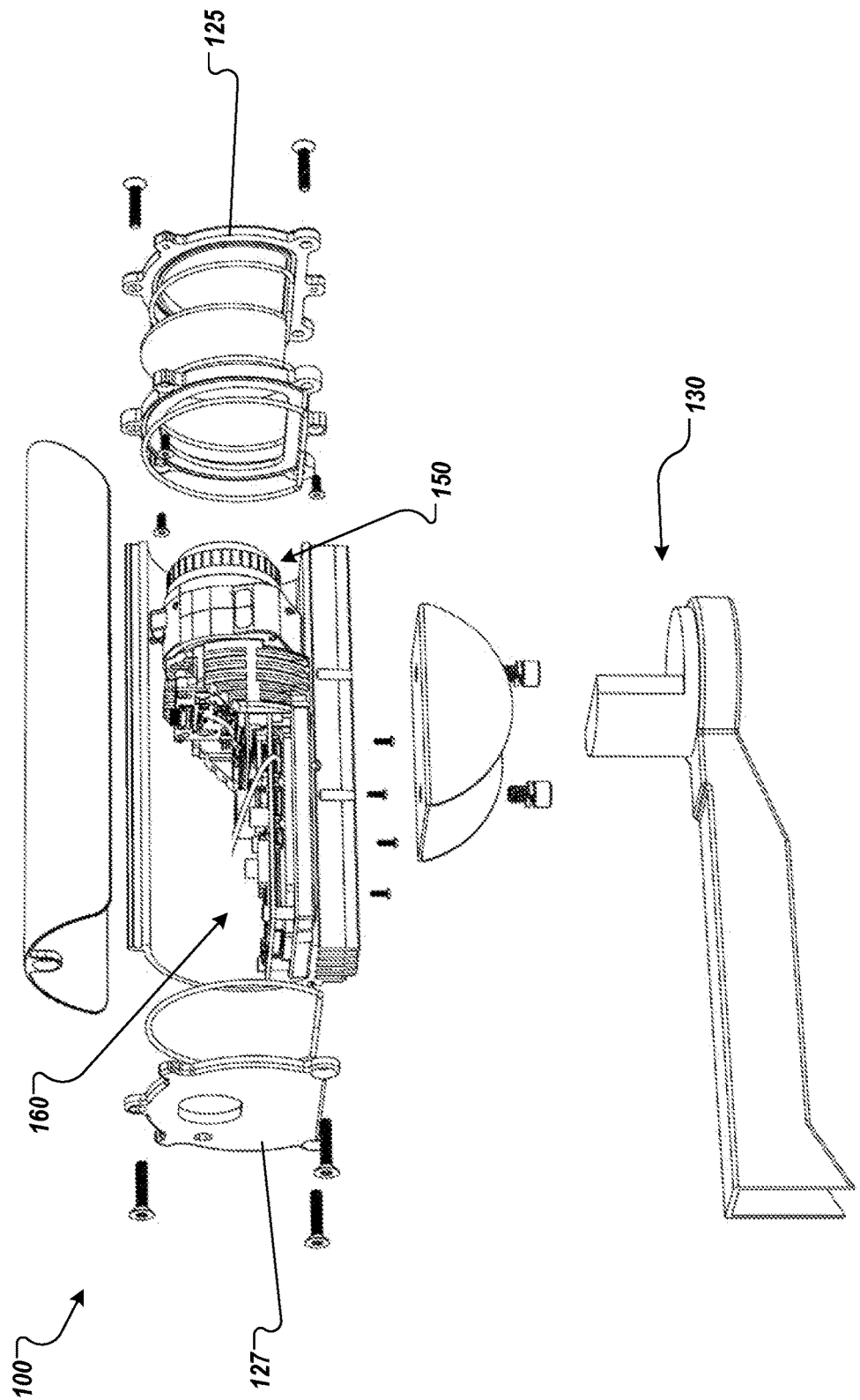
FIG. 1C is a diagram depicting an exploded isometric view of a camera system, in accordance with an embodiment of the disclosure.
Figure 1D:
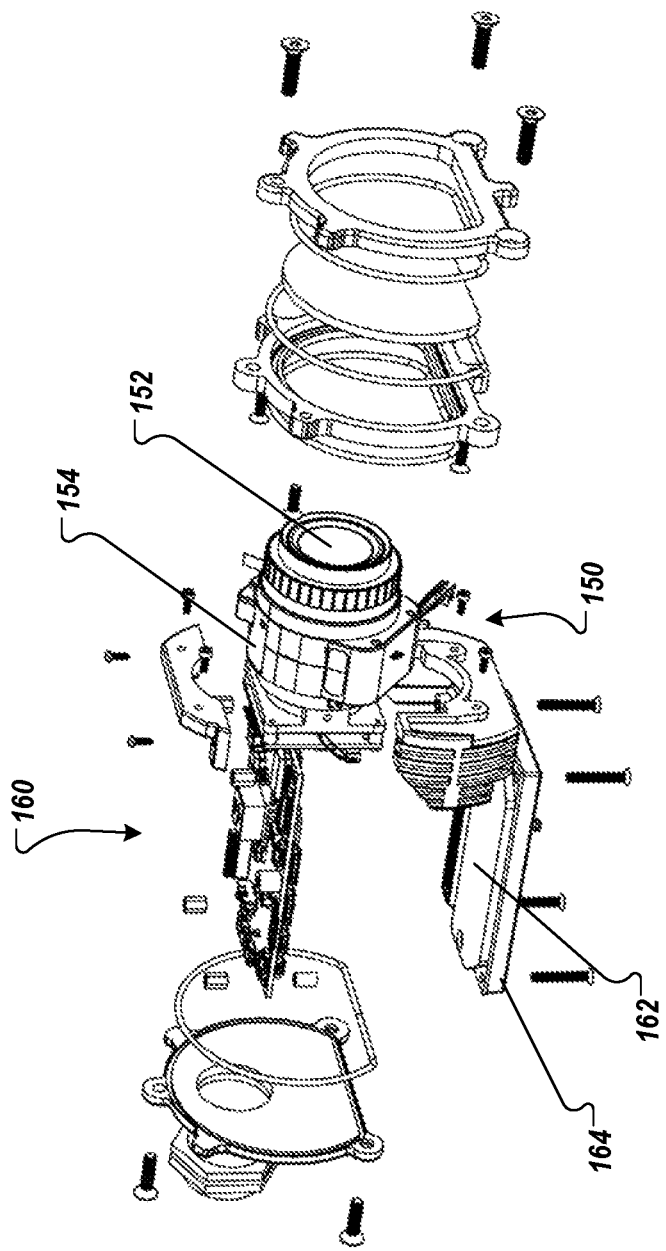
FIG. 1D is a diagram depicting an exploded isometric view of a camera system, in accordance with an embodiment of the t disclosure.

FIGS. 1C and 1D are isometric exploded views of camera system 100 that illustrate various electrical components in the camera system according to embodiments of the disclosure. Camera system 100 includes camera 150 and system-on-module (SOM) 160. Camera 150 includes lens 152 and motor 154. In various embodiments, camera 150 includes a charge-coupled device (CCD) image sensor. Motor 154 is to physically adjust lens 152. Camera 150, in various embodiments, includes various lens functions, such as, focus, zoom, aperture and infrared (IR) cut filter. In various embodiments, motor 154 (or a combination of motors) adjusts the various lens functions of camera 150 (e.g., focus, zoom, aperture and/or IR cut filter).

SOM 160 includes various components that control various features of the camera system. SOM 160 includes GPU 162. GPU 162, in various embodiments, performs various functions related to processing image information captured by camera 150. Additional description of GPU 162 is described in further detail below. SOM 160 also includes thermal transfer plate 164. In one embodiment, thermal transfer plate 164 transfers heat away from GPU 162 (and any other heat generating components of the camera system). Thermal transfer plate 164 is placed in proximity to heat sink 115 of housing 105. As such, heat generated by GPU 162 is transferred away from the GPU by thermal transfer plate 164 and heat sink 115. Further description of SOM 160 is described in further detail below with respect to at least FIG. 3.

As depicted in at least FIGS. 1A-D, camera system 100 includes a single camera 150 that is disposed proximate to the second distal end of housing 105. Alternatively, camera system 100 can include a second camera (similar to camera 150) that is disposed at the first distal end of housing 105. Accordingly, camera system 100 includes two cameras that capture images from opposite ends of housing 105.

As described in further detail below, reduced image information is generated, at least in part, by GPU 162. The reduced image information is then transmitted over a network (e.g., local area network (LAN), wide area network (WAN), etc). The reduced information can be transmitted at various instances, such as in real-time, periodically, and so on. In one embodiment, reduced information is stored in storage and/or memory at the camera system 100.

Figure 2:
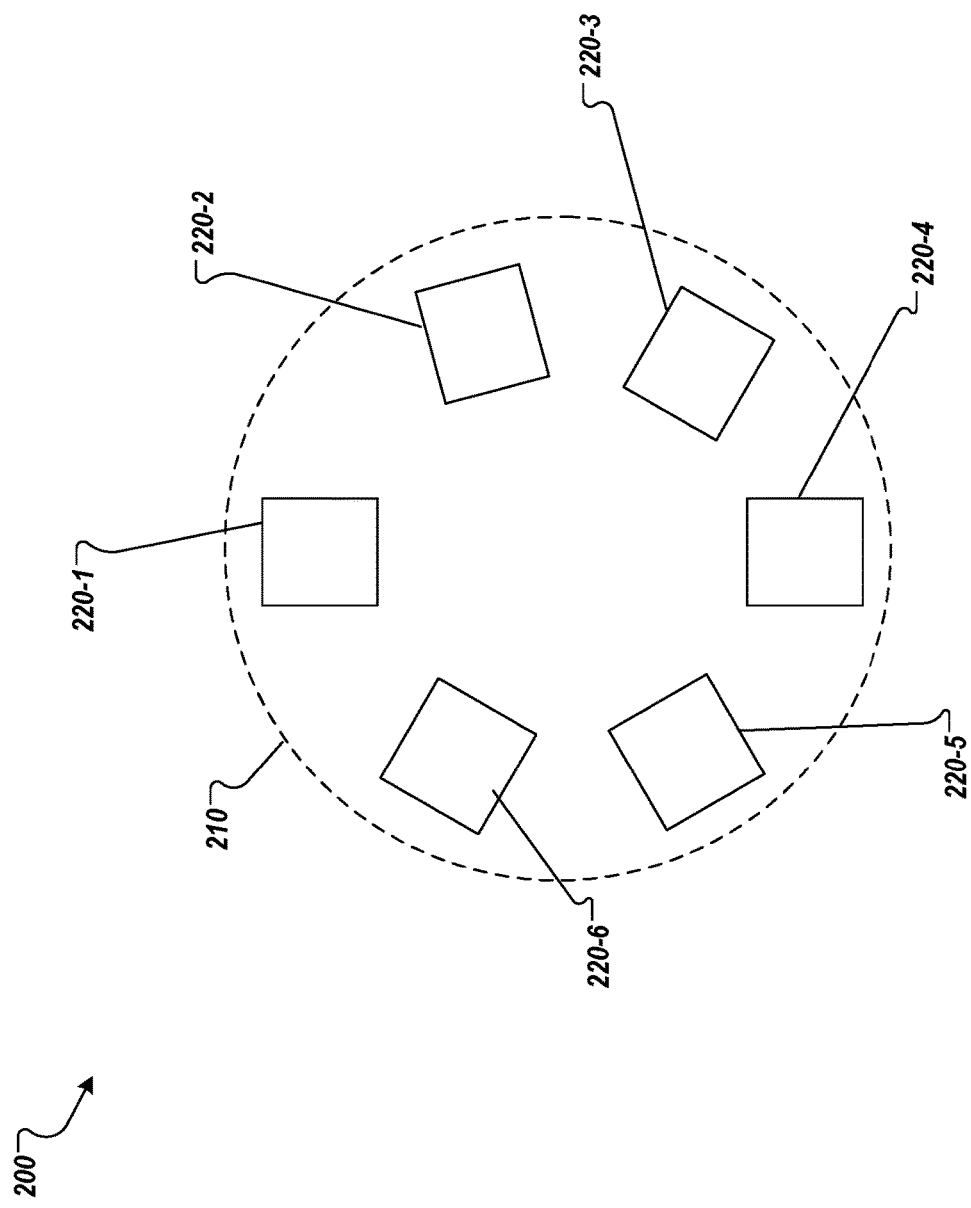
FIG. 2 is a diagram depicting a top view of a camera system including a plurality of cameras, in accordance with an embodiment of the disclosure.
Figure 3:
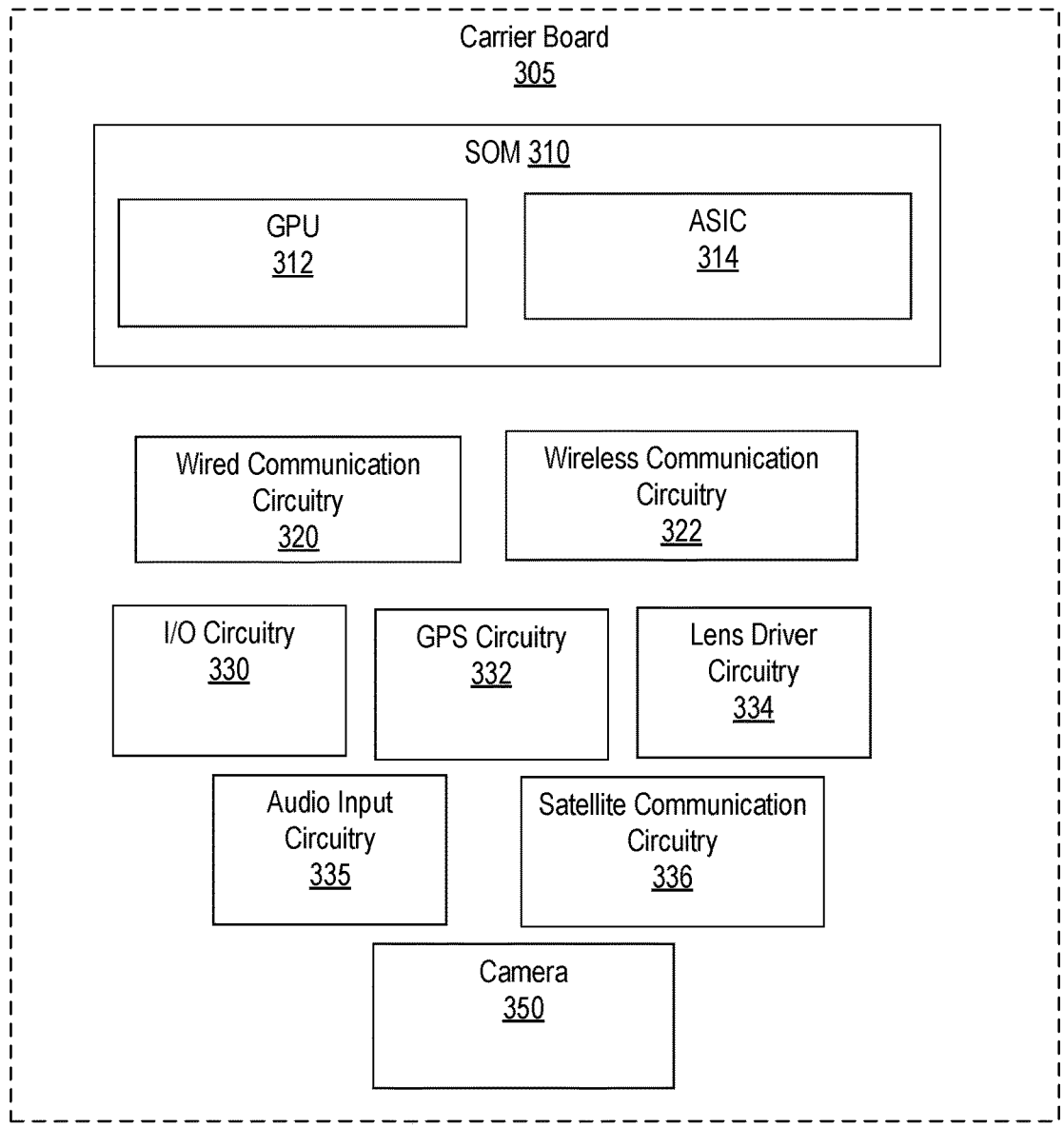
FIG. 3 is a block diagram of a camera system, in accordance with an embodiment of the disclosure.

FIG. 2 depicts a top view of camera system 200 according to an embodiment of the disclosure. Camera system 200 is similar to camera system 100 depicted with respect to FIG. 1. As shown in FIG. 2, system 200 includes six cameras 220 (e.g., cameras 220-1 through 220-6) disposed in housing 210. Cameras 220 are positioned radially with respect to one another. The form-factor of housing 210 can be any shape that facilitates in housing a plurality of cameras. It should be appreciated that camera system 200 can include any number of cameras (e.g., 2 cameras, 3 cameras, 4 cameras, 5 cameras, etc.) and is not limited to the number of cameras depicted in FIG. 2. FIG. 3 illustrates a block diagram of camera system 300 (e.g., camera system 100 and camera system 200) according to an embodiment of the disclosure. Camera system 300, in various embodiments, includes various modular components (e.g., circuitry) coupled to carrier board 305 (e.g., PCB board). A carrier board, as described herein, is the junction between SOM 310 and various modules (or circuitry) that are coupled to carrier board 305. The modules that are coupled to the carrier board are described in further detail herein. The modular camera system allows for various combinations of functionality which is described in further detail below.

Carrier board 305 includes SOM 310. In one embodiment, SOM 310 includes GPU 312 and application-specific integrated circuit (ASIC) 314. As described herein, GPU 312 is communicatively coupled to camera 350 (e.g. camera 150) within housing 105. As a result, uncompressed image information (e.g., image data) captured by camera 350 is processed by GPU 312. For example, image information may be captured in a high bit depth (e.g., >8 bits such as 10 bits, 12 bits and so on) and sent to GPU 312 for processing in the high bit depth. Accordingly, image information captured by the camera such as dynamic range, temporal and spatial detail, and resolution is not lost due to compression.

In a more specific example, the high bit depth of the image information provided to the GPU is beneficial in facial recognition. The high bit depth (e.g., 10 bit or 12 bits) provides an increased number of discrete intervals of pixel information to the GPU to enhance the process of facial recognition. In such an example, 12 bit image information includes 4096 levels of color and luminance. In a convention camera system, 8 bit image information provided to a processing unit (e.g., CPU or GPU). The 8 bit image information includes 256 levels of color and luminance information.

Additionally, a GPU has increased image processing functionality as compared to a conventional CPU. As such, the GPU is able to process frames at a faster rate than a conventional CPU. This results in the GPU able to process increased information in the time domain (that was lost due to compression of the image information in the conventional system). Also, in the facial recognition example, spatial information is retained by doing an object detection followed by a bounding box subsample of the object/subject of interest.

GPU 312, in various embodiments, is able to generate the reduced information, as described above. For example, the camera system captures image information (e.g., image data). The GPU is then able to reduce the captured data into specific and concise information. For example, in the fish ladder use case, the camera system can capture hundreds or thousands of images of fish swimming by the camera system. The GPU 312 is then able to analyze the data and generate reduced information associated with the fish swimming by the camera system. The reduced information can include, but is not limited to, the quantity of fish, the type of species, time-stamp of the fish passing by the camera system or a combination thereof. For example, the reduced information is generated by GPU 312 performing machine learning (e.g., neural networks and deep neural networks (DNN)), as described herein.

ASIC 314, in various embodiments, provides image pre-processing for GPU 312. It should be appreciated that image pre-processing, as described herein, is a functionality (or "instinct") of camera system 300 that is similar in function to the human visual cortex. As such, the image pre-processing enables the camera system to "sense" certain subjects (e.g., people and faces), movement (e.g., optical flow), color information, and fusion of multiple types of image sensors (e.g., infrared sensors). In various embodiments, the pre-processing information is provided to the GPU via the same channels as the original picture information. As a result, the camera system is provided additional (pre-processed) sensory information from which to make decisions to identify, detect and/or locate objects.

ASIC 314, in one embodiment, is a field-programmable gate array (FPGA). In one embodiment, ASIC 314 stitches together feeds from a plurality of cameras. A camera feed is the output of the camera 150 (e.g., video, images). The camera feed can be image information generated in real-time. For example, referring to FIG. 2, six different cameras (e.g., cameras 220-1 through 220-6) can capture separate images at the same time. The ASIC can stitch the six images together to generate a single image (or camera feed). In such an example, the single image (or camera feed) is six separate images (or camera feeds) combined together to appear as a single image (e.g., a 360-degree panoramic image). The stitched image is then transmitted to the GPU for further processing.

In another embodiment, the pre-processing of image data by the ASIC 314 includes, but is not limited to, identifying an object in an image (e.g., fish species, child, adult, etc.), location of objects in the image (e.g., location of faces, fish, etc.), movement in the image (e.g., fish swimming, pedestrians walking by store front, etc.), detection of the object (e.g., determine that a fish is in the image), etc. The pre-processed information is then transmitted to the GPU for further processing.

Carrier board 305 includes various modules (or circuitry) that are coupled to carrier board 305. The modules/circuitry, in one embodiment, are printed circuit boards (PCBs) that releasably connect with the carrier board. This enables for quick swapping of various modules to provide for various functionality of the camera system. In some embodiments, carrier board 305 includes, but is not limited to, wired circuitry 320, wireless circuitry 322, I/O circuitry 330, global positioning circuitry (GPS) 332, lens driver circuitry 334, audio input circuitry 335, and satellite communication circuitry 336.

Wired circuitry 320 allows for wired communication from the camera system. The wired communication can be communicatively coupled to a device of an end user. Wireless communication circuitry 322 allows for wireless communication over a network. For example, the wireless communication can be, but is not limited to, Bluetooth, WiFi, etc. Wired circuitry and/or wireless circuitry can implement various processing protocols such as Modbus, controller area network (CAN bus), Ethernet/IP, etc. In various embodiments, communication to/from the camera system can includes satellite communication.

I/O circuitry 330 allows for various types of I/O protocols/standards such as, but not limited to, USB 2.0, USB 3.0, RJ 45, etc. GPS circuitry 332 allows for satellite-based radio-navigation with the camera system. For example, image data processed by the camera system is associated with GPS coordinates. Lens driver circuitry 334 drives one or motors of the camera to change various functions of the lens of the camera (e.g., focus, zoom, aperture and IR cut filter, etc.). Audio input circuitry 335 allows for audio input at the location of the camera system. For example, audio input circuitry 335 is a microphone that captures audio signals (e.g., people talking) at the location of the camera system. Satellite communication circuitry 336 enables communication via a satellite. For example, the data from the camera system is transmitted to a satellite via satellite communication circuitry 336.

In various embodiments, camera system 300 includes other modules/circuitry (not shown). For example, camera system 300 includes power-over-Ethernet (POE) (e.g., up to 90-watt power converter) that allows the camera system to be powered from an Ethernet cable (and not from a separate power supply). Additionally, camera system 300 can include a power conversion circuitry. The power input can be in a range of 60 volt (V) to 12V or include other voltages such as 5V, 4V, 3.3V, 2.8V, 1.8V and 1.2V. In some embodiments, camera system 300 includes modules/circuitry such as gigabit Ethernet, SD Card, M.2 PCIe, fan, USB, and general I/O.

In various embodiments, the camera system implements machine learning. In particular, GPU 312 is able to recognize various patterns in image data via processing of one or more neural networks. For example, the neural network is trained to facilitate in the machine learning of the camera system. In one embodiment, the neural network is trained to recognize patterns in image data generated by the camera system. For example, in the fish ladder use case, the neural network is trained to look for fish in the image data and determine, among other things, a quantity and/or species of fish. Accordingly, the neural network model is trained to automatically determine a quantity and/or species of fish based on image information captured by the camera of the camera system. In one embodiment, the neural network is trained based on receiving image information of various fish that includes the respective species of fish and also based on feedback of the received fish species determinations made by the neural network model. In various embodiments, the GPU is programmed using pre-developed frameworks for splitting neural networks into kernels or functional pieces that are processed in parallel in the GPU. As a result, the GPU is well-suited for inference from the convolution or deep neural networks.

In one embodiment, carrier board 305 is communicatively coupled to camera 350. In one embodiment, camera system 300 includes a single camera (e.g., camera 154) that is coupled to carrier board 305. Alternatively, camera system 300 includes a plurality of cameras (e.g., cameras 210-1 through 210-6) that are coupled to carrier board 305.

As described above, camera system 300, includes various modular components (e.g., circuitry) coupled to carrier board 305 (e.g., PCB board). The modular camera system allows for various combinations of functionality which is described in further detail below. For example, if it is desired that camera system 300 utilizes wireless communication with a network, then the camera system includes wireless circuitry 322 (and not wired circuitry 320) coupled to the carrier board. Similarly, if it is desired that camera system 300 utilizes a wired communication protocol to output image information, then camera system includes wired circuitry 320 (and not wireless circuitry) that is releasably coupled to the carrier board.

Figure 4:
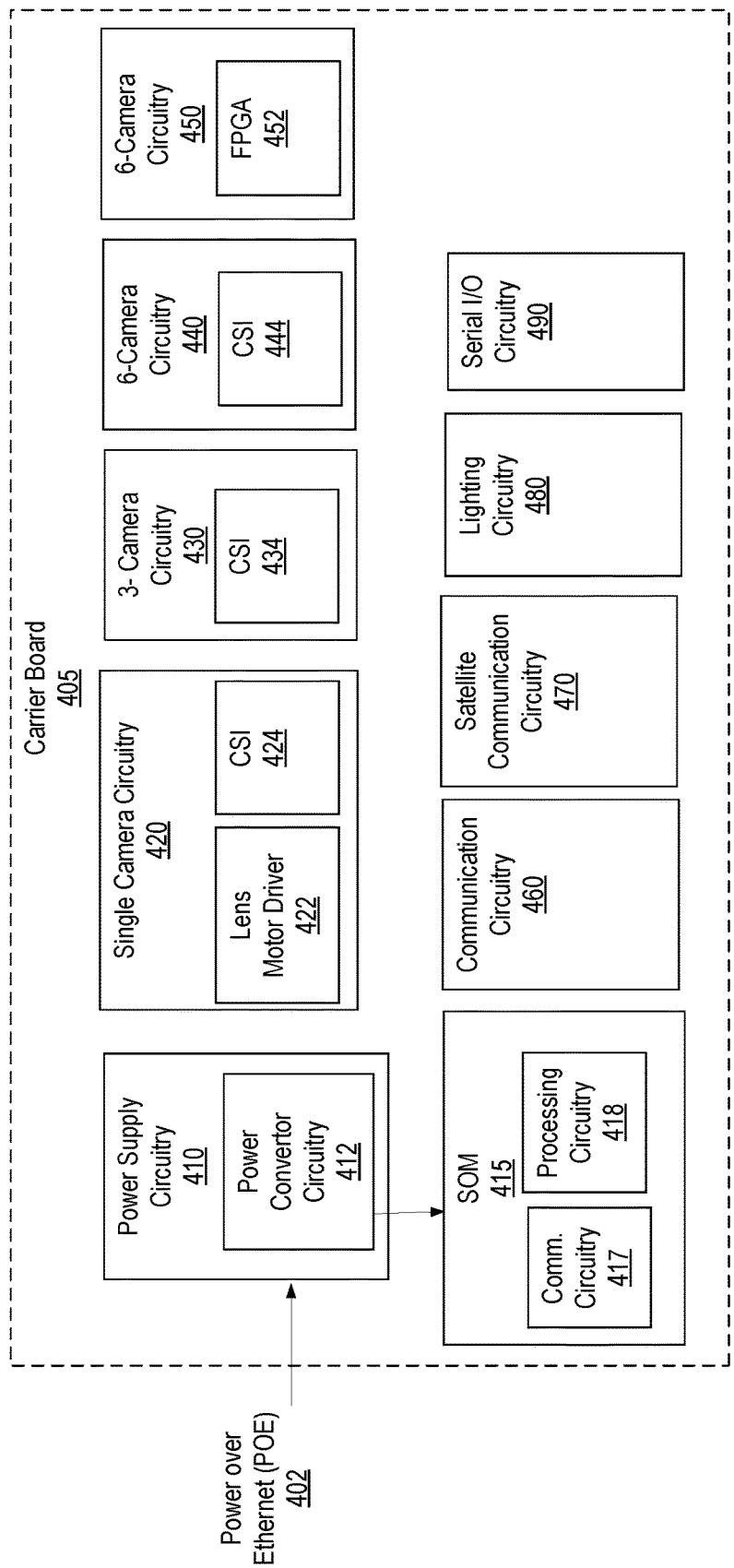
FIG. 4 is a block diagram of a camera system, in accordance with an embodiment of the disclosure.

FIG. 4 illustrates a block diagram of camera system 400 (e.g., camera system 100 and camera system 200) according to an embodiment of the disclosure. Camera system 400, in various embodiments, includes various modular components (e.g., circuitry) coupled to carrier board 405 (e.g., PCB board). The modular camera system allows for various combinations of functionality which is described in further detail below. For example, as described in further detail herein, the modular components (e.g., circuitry) are electrical modular subsystems that are disposed on functionally distinct circuits. The modular components can include, but are not limited to, a satellite modem, 4G Long-Term Evolution (LTE) modem, lighting module, I/O module. In various embodiments, the camera portion of the modules includes a system of pluggable camera input and lens controls. This allows the camera system to accept camera feeds (e.g., 1-6 camera feeds) and control lenses (e.g., 1-6 camera lenses) depending on the desired configuration.

Camera system 400 includes power circuitry 410 and SOM 415. In various embodiments, power circuitry 410 and SOM 415 are releasably coupled to carrier board 405. Power circuitry 410 receives Power over Ethernet (POE) 402. POE 402 is to power camera system 400, such as SOM 415 and other components as described herein. Power circuitry 410 includes power converter circuitry 412. Power converter circuitry 412 is to convert POE 402 to the desired power for the respective components in camera system 400 (e.g., SOM 415). In various embodiments, power supply circuitry 410 includes other components/circuitry such as, but not limited to, storage (e.g., secure digital (SD) card) and features for connection, communication and/or power supply (e.g., M.2 slot, USB 2.0/3.0, and CAN bus)

SOM 415 includes communication circuitry 417 and GPU 418. Communication circuitry 417 enables communication via various communication protocols (e.g., Bluetooth, WiFi, etc.).

Camera system 400 also includes single camera circuitry 420, 3-camera circuitry 430, 6-camera circuitry 440 and 6-camera circuitry 450. In various embodiments, single camera circuitry 420, 3-camera circuitry 430, 6-camera circuitry 440 and 6-camera circuitry 450 are releasably coupled to carrier board 405.

Single camera circuitry 420 is circuitry that enables camera system 400 to implement a single camera (e.g., camera 154 in system 100). Single camera circuitry 420 includes, among other things, lens driver 422 and camera serial interface (CSI) 424. Lens driver circuitry 422 drives one or motors of the camera to change various functions of the lens of the camera (e.g., focus, zoom, aperture and IR cut filter, etc.). CSI 424 is the interface between the camera and the host processor (e.g., GPU). In general, CSI is a specification of the Mobile Industry Processor Interface (MIPI) Alliance that defines the interface between the camera and the host processor. It should be appreciated that when camera system 400 is implemented with a single camera then single camera circuitry 420 is releasably coupled with carrier board 405 (and SOM 415).

3-camera circuitry 430 enables camera system 400 to implement three cameras. 3-camera circuitry 430 includes at least CSI 434. CSI 434 is similar to CSI 424 described above. It should be appreciated that when camera system 400 is implemented with three cameras then 3-camera circuitry 430 is releasable coupled with carrier board 405 (and SOM 415).

6-camera circuitry 440 enables camera system 400 to concurrently implement six different cameras. In various embodiments, 6-camera circuitry 440 includes CSI 444. CSI 444 is similar to CSI 424 (and CSI 434) described above. It should be appreciated that when camera system 400 is implemented with six different cameras then, in one embodiment, 6-camera circuitry 444 420 is releasable coupled with carrier board 405 (and SOM 415).

6-camera circuitry 450 enables camera system 400 to concurrently implement six different cameras. In one embodiment, 6-camera circuitry 440 is separate and distinct from 6-camera circuitry 440. Alternatively, the features and functionality of 6-camera circuitry 440 and 450 are combined to form single 6-camera circuitry. 6-camera circuitry 450 includes FPGA 452 (or ASIC). FPGA 452 is similar to FPGA 314, as described above. For example, FPGA 452 provides image pre-processing to GPU 418 and image stitching, as described above. The image pre-processing can include dewarp, optical flow and stereo image processing. For example, the image pre-processing enables the camera system to "sense" certain subjects (e.g., people and faces), movement (e.g., optical flow), color information, and fusion of multiple types of image sensors (e.g., infrared sensors). In various embodiments, the pre-processing information is provided to the GPU via the same channels as the original picture information. As a result, the camera system is provided additional (pre-processed) sensory information from which to make decisions to identify, detect and/or locate objects Camera system 400 also includes communication circuitry 460, satellite communication circuitry 470, lighting circuitry 480 and serial I/O circuitry 490. Communication circuitry 460 supports various communication means for camera system 400. In one embodiment, communication circuitry 460 includes a cellular modem to enable camera system 400 to perform cellular communication. In another embodiment, camera system includes a GPS modem to enable camera system 400 to communicate with GPS satellites and calculate a location of the camera system.

Satellite communication circuitry 470 enables camera system 400 to perform satellite communication. For example, camera system 400 transmits image data (e.g., reduced information) via satellite communication protocols.

Lighting circuitry 480 enables control of lighting functionality of camera system 400. For example, camera system includes lights (e.g., light emitting diodes (LED)) to illuminate objects in proximity to the camera.

Serial I/O circuitry 490 enables camera system 400 to perform serial communication. Serial I/O circuitry 490 supports various serial communication protocols and I/O modules such as CAN bus, RS485, RS 232 solid state relay (SSR), etc.

FIG. 5 depicts a flow chart of method 500 related to processing image information according to an embodiment of the disclosure. The methods and each of their individual functions, routines, subroutines, or operations may be performed by processing logic of a computing device (e.g., GPU) executing the method. The processing logic may include hardware, software, firmware, or a combination thereof. For example, processing logic may include a general purpose and/or special purpose processor that executes instructions for performing the methods.

Referring to FIG. 5, at 510 of method 500, a camera disposed in a hermetically sealed housing captures an image. For example, camera 150 is disposed in hermetically sealed housing 105. Camera system 100 (that includes camera 150), in one embodiment, is disposed underwater and takes images of fish in proximity to the camera. In various embodiments, hermetically sealed housing 105 comprises an external heat sink 115 integrated with the hermetically sealed housing.

At 520, a GPU processes image information of the image to recognize patterns in the image information. For example, camera system 100 is disposed under water to track fish swimming past the camera system. In one embodiment, GPU 312 processes a neural network that is trained determine a species of fish by its visual appearance. For example, the neural network is trained to determine the visual distinctions between various species of fish.

In various embodiments, camera system 300 (that includes GPU 312) is disposed in a hermetically sealed housing (e.g., housing 105). Additionally, the housing includes an external heat sink 115 to absorb heat generated by the GPU and passively cool the camera system.

At 530, the processed information is output from the camera system. For example, camera system 100 is communicatively coupled to a network (e.g., LAN, WAN, etc.). As such, the reduced information (e.g., quantity of fish, species of fish, quantity of pedestrians walking by a store front) is transmitted from the camera system over the network.

Figure 6:
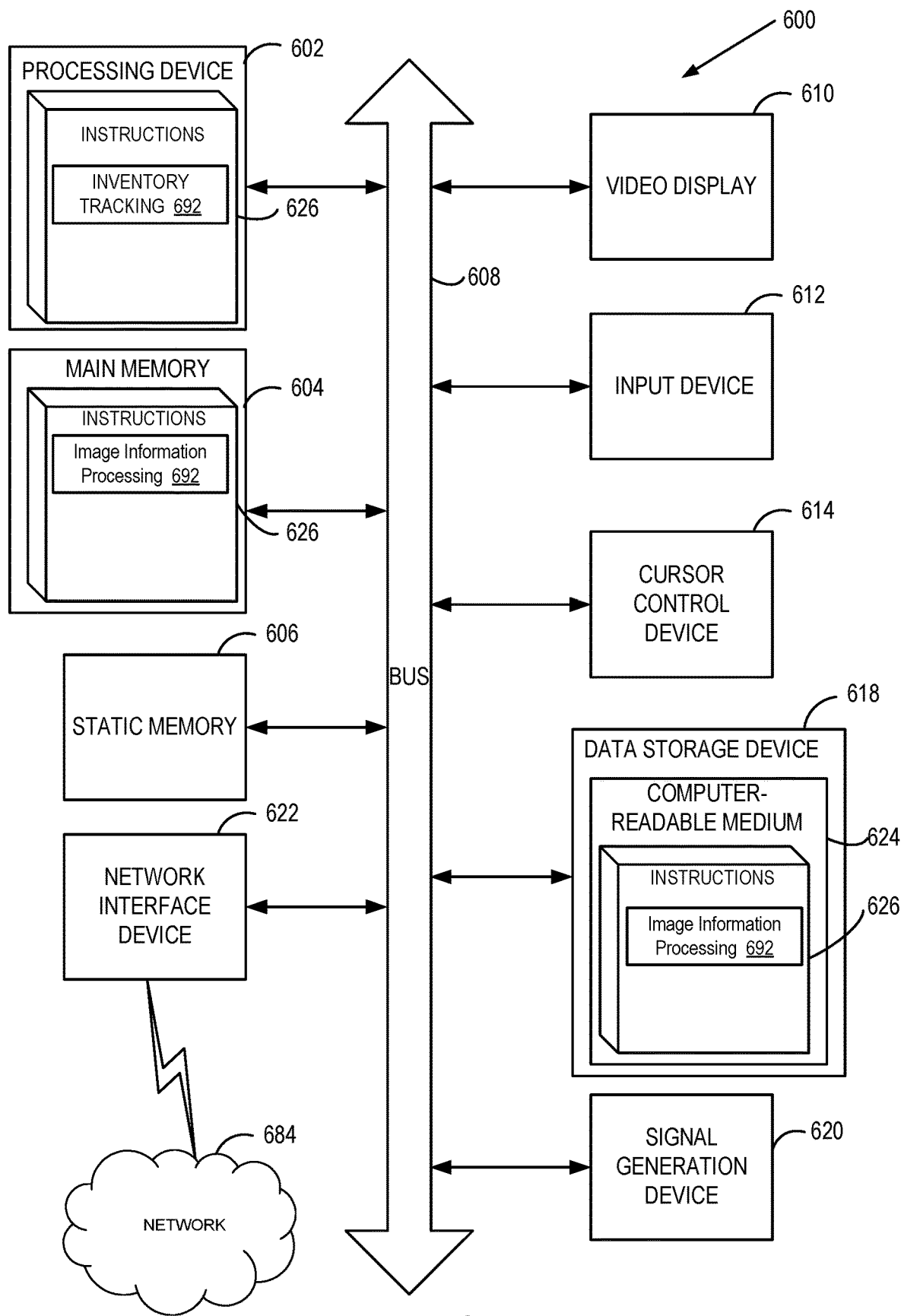
FIG. 6 is a block diagram of a computer system, in accordance with an embodiment of the disclosure.

FIG. 6 depicts a block diagram of a computer system operating according to an embodiment of the disclosure. In various illustrative examples, computer system 600 may correspond to camera system 100 of FIG. 1, camera system 200 of FIG. 2, camera system 300 of FIG. 3, and/or camera system 400 of FIG. 4.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a laptop computer, a tablet computer, a server computing device, a network router, switch or bridge, an electronic display device, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a main (volatile) memory 604 (e.g., random access memory (RAM)), a static (non-volatile) memory 606 (e.g., read-only memory (ROM) or electrically-erasable programmable ROM (EEPROM)), and/or a data storage device 618, which may communicate with each other via a bus 608.

Processing device 602 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622 (e.g., a wireless communication module, wireless modem, etc.). Computer system 600 also may include a video display unit 610 (e.g., an LCD), an input device 612 (e.g., a keyboard, touch screen, touchpad, etc.), and a cursor control device 614 (e.g., a mouse).

Data storage device 618 may include a non-transitory computer-readable storage medium 624 on which it may store instructions 626 encoding any one or more of the methods or functions described herein, including instructions encoding method, 500 for image information processing. For example, data storage device 618 may include instructions 626 for image information processing 692, which may correspond to similarly named components described earlier herein.

Instructions 626 may also reside, completely or partially, within main memory 604 and/or within processing device 602 during execution thereof by computer system 600, hence, main memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory tangible medium that is capable of storing or encoding a set of instructions for execution by a computer or device that cause the computer or device to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICs, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "receiving", "identifying", "determining", "transmitting", "capturing", or the like, refer to actions and processes performed or implemented by a computer system that manipulates and transforms data represented as physical (electronic) quantities within the computer system registers and memories into other data similarly represented as physical quantities within the computer system memories or registers or other such information storage or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. An apparatus comprising:
    a hermetically sealed housing including an external heat sink integrated with the hermetically sealed housing as a single unit, wherein the external heat sink comprises various protrusions extending an entire length of a bottom surface of the hermetically sealed housing;
    a first camera disposed within the hermetically sealed housing, the first camera comprising:
        a lens; and
        a motor, wherein the motor is to physically adjust the lens; and
    a graphics processing unit (GPU) coupled to the camera and disposed within the hermetically sealed housing, the GPU is to:
        process image information of an image captured by the first camera, wherein the external heat sink is to absorb heat generated by the GPU; and
        apply a neural network to recognize patterns of the image information.

2. The apparatus of claim 1, further comprising:
    an application-specific integrated circuit (ASIC) coupled to the GPU, wherein the ASIC is to pre-process the image information captured by the first camera.

3. The apparatus of claim 2, wherein the ASIC pre-processes the image information corresponding to at least one of:
movement of an object;
detection of the object;
identification of the object;
optical flow; or
stereo image processing.

4. The apparatus of claim 2, further comprising:
a system-on-module (SOM), wherein the SOM comprises the GPU and the ASIC.

5. The apparatus of claim 4, wherein the SOM further comprises at least one of:
a communication circuit;
an input/output (I/O) circuit;
a lens driver circuit;
a global positioning system (GPS) circuit;
an audio input circuit; or
a satellite communication circuit.

6. The apparatus of claim 1, further comprising:
a second camera disposed within the hermetically sealed housing, wherein the GPU is further to process image information captured by the second camera.

7. The apparatus of claim 1, wherein the GPU is disposed adjacent to the external heat sink.

8. A camera system comprising:
a hermetically sealed housing comprising an external heat sink integrated with the hermetically sealed housing as a single unit, wherein the external heat sink comprises various protrusions extending an entire length of a bottom surface of the hermetically sealed housing;
a plurality of cameras disposed within the hermetically sealed housing, each of the plurality of cameras comprising:
a lens; and
a motor to physically adjust the lens of the respective camera of the plurality of cameras; and
a system-on-module (SOM) coupled to the plurality of cameras, wherein the SOM comprises:
an application-specific integrated circuit (ASIC) to pre-process image information captured by one or more of the plurality of cameras; and
a graphics processing unit (GPU) coupled to the ASIC, wherein the GPU is to:
process the pre-processed image information; and
apply a neural network to recognize patterns of the image information.

9. The camera system of claim 8, wherein the ASIC pre-processes the image information corresponding to at least one of:
movement of an object;
detection of the object;
identification of the object;
optical flow; or
stereo image processing.

10. The camera system of claim 8, wherein the ASIC combines image information captured by the plurality of cameras.

11. The camera system of claim 8, wherein the SOM further comprises at least one of:
a wireless communication circuit releasably coupled to the SOM;
a wired communication circuit releasably coupled to the SOM;
an input/output (I/O) circuit releasably coupled to the SOM;
a lens driver circuit releasably coupled to the SOM;
a global positioning system (GPS) circuit releasably coupled to the SOM; an audio input circuit releasably coupled to the SOM; or
a satellite communication circuit releasably coupled to the SOM.

12. The camera system of claim 8, wherein the motor of each camera of the plurality of cameras is to adjust at least one of:
focus;
zoom;
aperture; or
infrared (IR) cut filter.

13. The camera system of claim 8, wherein the camera system is physically mounted under water.

14. The camera system of claim 8, wherein the GPU is disposed adjacent to the external heat sink.

15. The camera system of claim 8, wherein the hermetically sealed housing is substantially cylindrical.

16. A method for processing image information comprising:
capturing, by a camera disposed in a hermetically sealed housing, an image, wherein the hermetically sealed housing comprises an external heat sink integrated with the hermetically sealed housing as a single unit, wherein the external heat sink comprises various protrusions extending an entire length of a bottom surface of the hermetically sealed housing;
processing, by a graphics processing unit (GPU) disposed in the hermetically sealed housing, image information of the image to recognize patterns in the image information, wherein the external heat sink is to absorb heat generated by the GPU;
applying, by the GPU, a neural network to recognize patterns of the image information; and
outputting the processed image information and the recognized patterns.

17. The method of claim 16, wherein the outputting the processed image information comprises:
wirelessly transmitting, in real-time over a network, the processed image information via communications circuitry disposed in the hermetically sealed housing.

18. The method of claim 16, wherein an application-specific integrated circuit (ASIC) is coupled to the GPU, wherein the ASIC is to pre-process the image information captured by the camera.

19. The method of claim 18, wherein the ASIC pre-processes the image information corresponding to at least one of movement of an object, detection of the object, identification of the object, optical flow, or stereo image processing.

* * * * *